US008081982B2

United States Patent
Kuo

(10) Patent No.: US 8,081,982 B2
(45) Date of Patent: Dec. 20, 2011

(54) WIRELESS COMMUNICATION DEVICE AND COMMUNICATION METHOD THEREOF

(75) Inventor: Chia-Hao Kuo, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 243 days.

(21) Appl. No.: 12/650,783

(22) Filed: Dec. 31, 2009

(65) Prior Publication Data

US 2011/0098040 A1 Apr. 28, 2011

(30) Foreign Application Priority Data

Oct. 26, 2009 (CN) .......................... 2009 1 0308774

(51) Int. Cl.
*H04W 36/00* (2009.01)
*H04B 7/00* (2006.01)
*H04B 1/00* (2006.01)
*H04B 17/00* (2006.01)

(52) U.S. Cl. ............... 455/444; 455/513; 455/67.13; 455/63.1

(58) Field of Classification Search .............. 455/444, 455/513, 67.13, 63.1
See application file for complete search history.

(56) References Cited

U.S. PATENT DOCUMENTS

| | | | | |
|---|---|---|---|---|
| 5,594,949 A | * | 1/1997 | Andersson et al. | 455/437 |
| 5,754,958 A | * | 5/1998 | Tsuji et al. | 455/436 |
| 5,774,809 A | * | 6/1998 | Tuutijarvi et al. | 455/437 |
| 5,828,659 A | * | 10/1998 | Teder et al. | 370/328 |
| 5,884,145 A | * | 3/1999 | Haartsen | 455/63.2 |
| 6,009,332 A | * | 12/1999 | Haartsen | 455/450 |
| 6,011,970 A | * | 1/2000 | McCarthy | 455/436 |
| 6,064,890 A | * | 5/2000 | Hirose et al. | 455/513 |
| 6,088,591 A | * | 7/2000 | Trompower et al. | 455/438 |
| 6,122,517 A | * | 9/2000 | Imamura | 455/450 |
| 6,131,031 A | * | 10/2000 | Lober et al. | 455/444 |
| 6,256,500 B1 | * | 7/2001 | Yamashita | 455/441 |
| 6,311,065 B1 | * | 10/2001 | Ushiki et al. | 455/440 |

FOREIGN PATENT DOCUMENTS

TW 200744394 A 12/2007

* cited by examiner

*Primary Examiner* — Tilahun B Gesesse
(74) *Attorney, Agent, or Firm* — Altis Law Group, Inc.

(57) ABSTRACT

A wireless communication device and method includes selecting a group of neighboring base stations having a relatively stronger signal intensity among the neighboring base stations as servo base stations, and periodically detecting the signal intensities of the servo base stations and the candidate base station. Differences between the signal intensities of two selected neighboring base stations for each cycle of a continuous cycles are accumulated, where when the accumulated value exceeds a threshold value in a each cycle, the group of servo base stations are updated and weakest servo base stations with the strongest candidate base station in that cycle are replaced.

8 Claims, 4 Drawing Sheets

WIRELESS COMMUNICATION DEVICE AND COMMUNICATION METHOD THEREOF

INCORPORATING BY REFERENCE

This application has a foreign priority of 200910308774X filed Oct. 26, 2009 in China.

BACKGROUND

1. Technical Field

The present disclosure relates to a wireless communication device and wireless communication method thereof.

2. Description of the Related Art

With developments in wireless communication technology, wireless communication devices, such as mobile phones, are now widely used. A type of a wireless communication system includes a mobile phone and a number of neighboring base stations. In radio communications, the base station is a wireless communication station installed at a fixed location and used to as a hub in a local wireless network, and may also be a gateway between a wired network and the wireless network. In a cell reselection process, signal intensities of the neighboring base stations can be measured by the mobile phone, then the mobile phone selects six neighbor base stations with the strongest signal intensity in the neighboring base stations as servo base stations, and the other neighbor base stations act as candidate base stations. However, at any time after the cell reselection process, if a candidate station with the strongest signal intensity among the candidate stations slightly exceeds a servo base station with weakest signal intensity among the servo base stations in signal intensity, the mobile phone updates a list of the servo base stations by changing the strongest candidate station to a servo base station and the weakest servo base station to a candidate station. If the mobile phone updates the servo base station list too frequency, considerable power can be wasted.

Therefore, it is desirable to provide a wireless communication device and wireless communication method which can overcome the described limitations.

BRIEF DESCRIPTION OF THE DRAWINGS

Many aspects of the present wireless communication device and wireless communication method could be better understood with reference to the accompanying drawings. The components in the drawings are not necessarily drawn to scale, the emphasis instead being placed upon clearly illustrating the principles of the wireless communication device and wireless communication method. Moreover, in the drawings, like reference numerals designate corresponding parts throughout the several views.

DETAILED DESCRIPTION

Embodiments of the present wireless communication device and communication method thereof are now described in detail with reference to the drawings.

Figure 1:
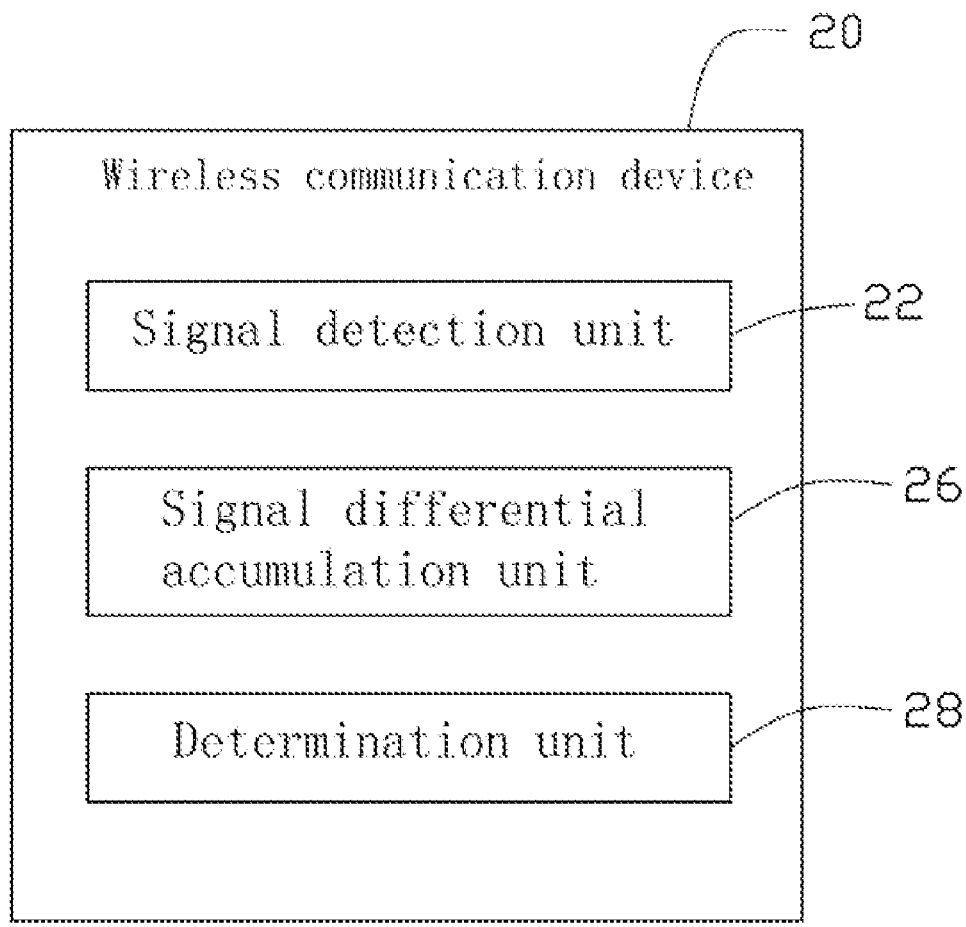
FIG. 1 is a functional block diagram of a wireless communication device, according to an exemplary embodiment.
Figure 2:
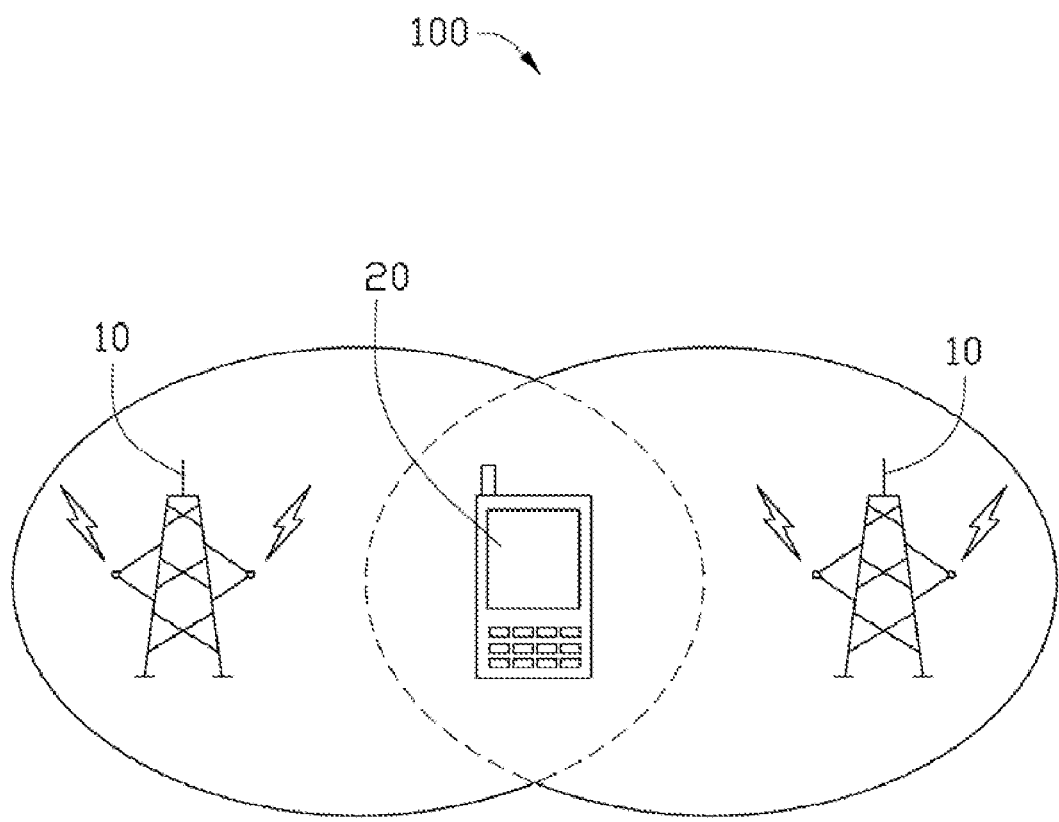
FIG. 2 shows the wireless communication device of the FIG. 1 as part of a wireless communication system.
Figure 3:
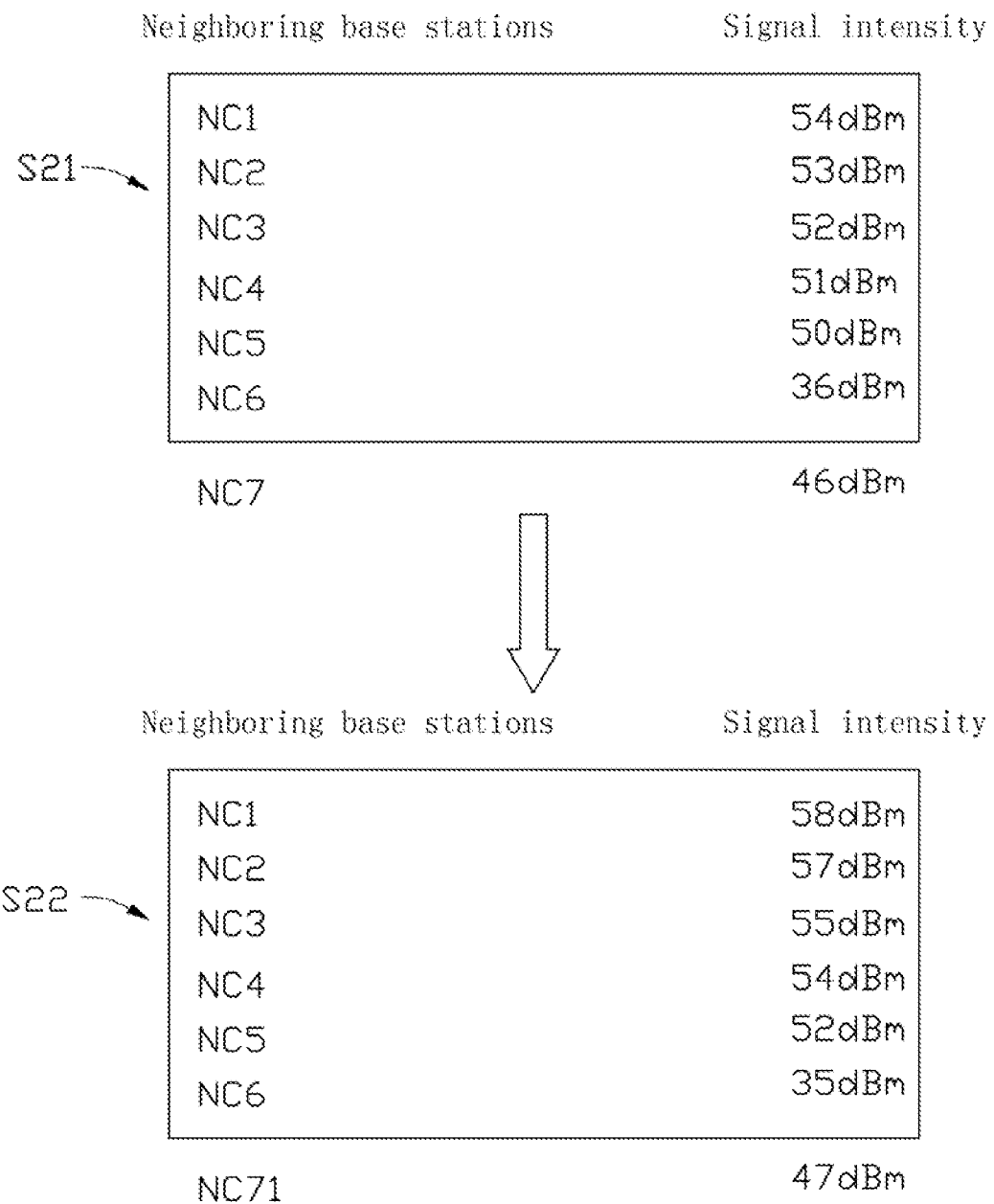
FIG. 3 is a list of signal intensity of a number of neighboring base stations around the wireless communication device of FIG. 1.

Referring to FIGS. 1-3, a wireless communication device 20 includes a signal detection unit 22, a signal differential accumulation unit 26, and a determination unit 28. The wireless communication device 20 is located in overlapping service range with six neighboring base stations 10. The neighboring base stations 10 generate wireless signals to provide wireless communication service in their respective service ranges. The wireless communication device 20 sends and receives wireless signals to communicate with the neighboring base stations 10.

During the bootstrap process of the wireless communication device 20, the wireless communication device 20 carries out a cell selection program to select six neighboring base stations 10 that have the relatively stronger signal intensity among the neighboring base stations 10 as servo base stations, and selects other neighboring base stations 10 that have relative weaker signal intensity as candidate base stations.

Thereafter, the signal detection unit 22 periodically detects the signal intensities of neighboring base stations 10 including the servo base stations and the candidate base stations, and updates the group of servo base stations 10 when necessary.

FIG. 3 shows the signal intensities of a number of neighboring base stations 10 in a first cycle S21 and a second cycle S22 immediately after the first cycle S21, for simplification, for each cycle, only the six servo base stations NC1~NC6 and a candidate base station NC7 (or NC71) that is the strongest among the candidate base stations in that cycle are shown. The shown candidate base station NC7 having a signal intensity slightly exceeds that of the servo base station NC6 with the weakest signal intensity among the servo base stations NC1~NC6. In this embodiment, although the candidate base station NC7 is 10 db stronger than the servo station NC6 in signal intensity in the first cycle, the wireless communication device 20 does not update the group of servo base stations by replacing the servo base station NC6 with the candidate base station NC7.

In the second cycle S22, the candidate base station NC71 is the strongest among the candidate base stations, whose signal intensity is 22 db stronger than that of the base servo station NC6 with the weakest signal intensity among the servo base stations in the second cycle.

The signal difference accumulation unit 26 is configured for accumulating differences between the signal intensities of two selected neighboring base stations 10 for each cycle of a number of continuous cycles, to obtain a total value. The two selected neighboring base stations 10 include a servo base station having the weakest signal strength among the servo base stations (hereinafter "the weakest servo base station") and a candidate base station having the strongest signal intensity among the candidate base stations (hereinafter "the strongest candidate base station") in the selected cycle. For example, in the first cycle, the difference in signal intensity between the strongest candidate base station NC7 and the weakest servo base station NC6 is 10 db, and in the second cycle, the difference in signal intensity between the strongest candidate base station NC71 and the weakest servo base station NC6 is 22 db. Therefore, the total value of the differences in the first and second cycles is 32 db.

The determination unit 28 pre-stores a threshold value. In this embodiment, the threshold value is 30 db. The determination unit 28 is configured for determining whether the total value exceeds the threshold value for each cycle. If the total value exceeds the threshold value in a cycle, the determination unit 28 updates the group of the servo base stations and replaces the weakest servo base station with the strongest candidate base station in the cycle. For example, in the second cycle of the described example, the total value accumulated by the signal difference accumulation unit 26 is 32 db and exceeds the threshold value 30 db, therefore the determination unit 28 replaces the servo base station NC6 with the candidate base station NC71. After the update, the total value is cleared and the signal difference accumulation unit 26 repeats the accumulation of differences in subsequent continuous cycles. In this embodiment, in any cycle, if the strongest candidate base station is weaker than the weakest servo base station in signal intensity, the total value is cleared and the signal difference accumulation unit 26 repeats the accumulation of differences in subsequent continuous cycles. Furthermore, in any cycle, if the strongest candidate base station is far stronger than the weakest servo base station in signal intensity, for example, the difference in signal intensity between the strongest candidate base station and the weakest servo base station exceeds the threshold value, the determination unit 28 replaces the weakest servo base station with the strongest candidate base station.

Figure 4:
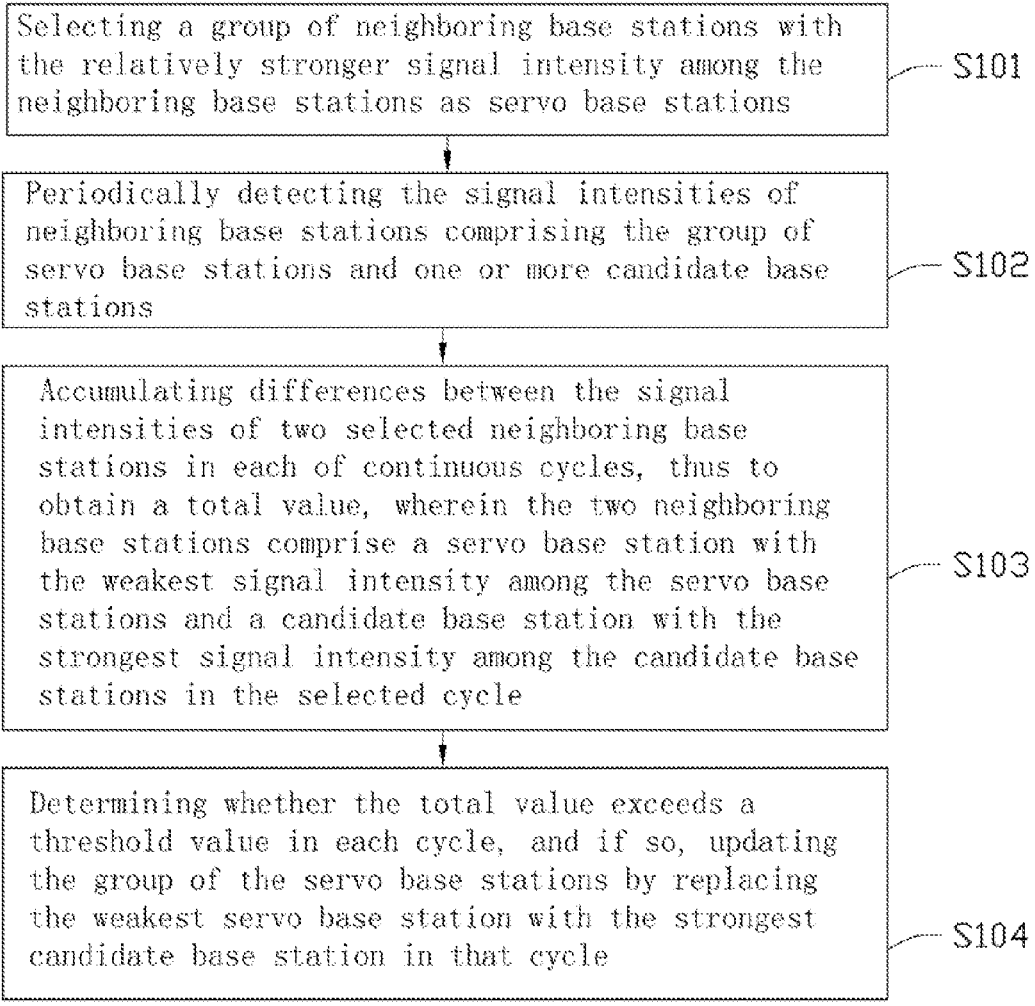
FIG. 4 is a flowchart of a wireless communication method, according to an exemplary embodiment.

Referring to FIG. 4, a flowchart of wireless communication method using the wireless communication device 20 is shown, as follows. In step 101, during the boot-strap process of the wireless communication device, the wireless communication device 20 carries out a cell selection program to select a group of, such as six neighboring base stations having relatively stronger signal intensity among the neighboring base stations as servo base stations. In step 102, the signal diction unit 22 periodically detects the signal intensities of neighboring base stations 10 including the servo base stations and the candidate base stations. In step 103: the signal differential accumulation unit 26 accumulates differences between the signal intensities of two selected neighboring base stations 10 for each cycle of a continuous cycle, obtaining a total value, the two neighboring base station 10 includes a servo base station having the weakest signal strength among the servo base stations and a candidate base station having the strongest signal intensity among the candidate base stations in the selected cycle. In step 104: the determination unit 28 determines whether the total value exceeds a threshold value for each cycle, and, if so, the determination unit 28 updates the group of the servo base stations and replaces the weakest servo base station with the strongest candidate base station in that cycle.

If in any cycle, the strongest candidate base station is weaker than the weakest servo base station in signal intensity, after step 103, the total value is cleared and the signal difference accumulation unit 26 repeats the accumulation of differences in subsequent continuous cycles before initializing step 104.

Compared with updating the servo base stations at any time when a candidate base station stronger than a servo base station is detected, by adopting more stringent conditions, the disclosed wireless communication device reduces unnecessary update time and conserves power, greatly extending standby time.

It will be understood that the above particular embodiments and methods are shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. A wireless communication device, comprising:
   a signal detection unit configured for periodically detecting signal intensities of neighboring base stations comprising a group of servo base stations and one or more candidate base stations;
   a signal differential accumulation unit configured for accumulating differences between the signal intensities of two selected neighboring base stations for each cycle of a number of continuous cycles, to obtain a total value, wherein the two selected neighboring base stations comprise a servo base station having the weakest signal strength among the servo base stations and a candidate base station having the strongest signal intensity among the candidate base stations in the selected cycle; and
   a determination unit pre-storing a threshold value, and configured for determining whether the total value exceeds the threshold value for each cycle, and updating the group of servo base stations by replacing the weakest servo base station having the strongest candidate base station in a cycle if the total value exceeds the threshold value in the cycle.

2. The wireless communication device as claimed in claim 1, wherein the signal differential accumulation unit is further configured for clearing the total value after the update.

3. The wireless communication device as claimed in claim 1, wherein the signal difference accumulation unit is further configured for clearing the total value when in a cycle the strongest candidate base station is weaker than the weakest servo base station in signal intensity.

4. The wireless communication device as claimed in claim 1, wherein the determination unit is also configured for updating the group of servo base stations by replacing the weakest servo base station among the servo base station with the strongest candidate base station among the candidate base station when in a cycle the strongest candidate base station is stronger than the weakest servo base station in signal intensity and the difference between the strongest candidate base station and the weakest servo base station exceeds the threshold value.

5. The wireless communication device as claimed in claim 1, wherein the threshold value is 30 db.

6. A wireless communication method, comprising:
   selecting a group of neighboring base stations having a relatively stronger signal intensity among the neighboring base stations as servo base stations;
   periodically detecting the signal intensities of the neighboring base stations comprising the group of servo base stations and one or more candidate base stations;
   accumulating differences between the signal intensities of two selected neighboring base stations in each of continuous cycles, thus to obtain a total value, wherein the two neighboring base stations comprise a servo base station with having the weakest signal intensity among the servo base stations and a candidate base station with the strongest signal intensity among the candidate base stations in the selected cycle;
   determining whether the total value exceeds a threshold value for each cycle, and, if the total value exceeds the threshold value, updating the group of the servo base stations by replacing the weakest servo base station with the strongest candidate base station in that cycle.

7. The method as claimed in claim 6, further comprising, if the strongest candidate base station is weaker than the weakest servo base station in signal intensity, after accumulating differences between the signal intensities of two selected neighboring base stations, the total value is cleared.

8. The method as claimed in claim 6, further comprising, if in any cycle, the strongest candidate base station is stronger than the weakest servo base station in signal intensity and the difference between the strongest candidate base station and the weakest servo base station exceeds the threshold value, replacing the weakest servo base station with the strongest candidate base station.

* * * * *